United States Patent
Eriksson et al.

(10) Patent No.: US 8,042,622 B2
(45) Date of Patent: Oct. 25, 2011

(54) ELECTRIC POWER TOOL WITH SWIVELLED CABLE CONNECTION

(75) Inventors: Kjell Thomas Martin Eriksson, Bromma (SE); Gunnar Christer Hansson, Stockholm (SE); Erik Vilhelm Persson, Täby (SE)

(73) Assignee: Atlas Copco Tools AB, Nacka (SE)

( * ) Notice: Subject to any disclaimer, the term of this patent is extended or adjusted under 35 U.S.C. 154(b) by 218 days.

(21) Appl. No.: 12/293,485

(22) PCT Filed: Mar. 16, 2007

(86) PCT No.: PCT/SE2007/000257
§ 371 (c)(1),
(2), (4) Date: Nov. 25, 2008

(87) PCT Pub. No.: WO2007/108745
PCT Pub. Date: Sep. 27, 2007

(65) Prior Publication Data
US 2009/0277660 A1  Nov. 12, 2009

(30) Foreign Application Priority Data
Mar. 20, 2006 (SE) ...................................... 0600619

(51) Int. Cl.
*B25F 5/00* (2006.01)

(52) U.S. Cl. ........ 173/171; 173/170; 173/217; 285/184; 439/11; 439/13; 439/372; 439/376; 439/446; 439/341; 174/84 R; 174/86; 174/87

(58) Field of Classification Search .................. 173/170, 173/171, 217; 285/184; 439/11, 13, 372, 439/376, 446, 341; 174/84 R, 86–87
See application file for complete search history.

(56) References Cited

U.S. PATENT DOCUMENTS

| 1,551,332 | A | * | 8/1925 | Schramm ....................... 285/181 |
| 2,503,281 | A | * | 4/1950 | Lynch et al. ................... 285/181 |
| 4,550,957 | A | * | 11/1985 | Keane ............................. 439/13 |
| 4,550,958 | A | * | 11/1985 | Smith ............................. 439/13 |

(Continued)

FOREIGN PATENT DOCUMENTS

DE  102004035390 A1  3/2006

(Continued)

OTHER PUBLICATIONS

English Language International Search Report dated June 20, 2007 issued in parent Appln. No. PCT/SE2007/000257.

*Primary Examiner* — Paul R. Durand
*Assistant Examiner* — Michelle Lopez
(74) *Attorney, Agent, or Firm* — Holtz, Holtz, Goodman & Chick, P.C.

(57) ABSTRACT

An electric power tool having a housing, a motor, a jack for receiving a connection plug of an electric cable, and a swivel unit mounted on the housing and carrying the jack, wherein the swivel unit includes a first head mounted on the housing for rotation about a first axis, and a second head mounted on the first head for rotation about a second axis. The first and second axes form an angle between them, and provide for freedom of rotation of the jack, thereby providing for positioning of the jack and routing of a connected cable in desired directions relative to the housing.

7 Claims, 2 Drawing Sheets

U.S. PATENT DOCUMENTS

| | | | | |
|---|---|---|---|---|
| 4,557,535 | A | * | 12/1985 | Keane .................. 439/13 |
| 4,557,536 | A | * | 12/1985 | Geurts .................. 439/21 |
| 4,676,241 | A | * | 6/1987 | Webb et al. .......... 128/207.14 |
| 4,842,059 | A | * | 6/1989 | Tomek .................. 166/65.1 |
| 5,092,793 | A | * | 3/1992 | Stephan ................ 439/446 |
| 5,893,420 | A | * | 4/1999 | Schoeps ................ 173/181 |
| 6,105,687 | A | | 8/2000 | Hansson |
| 7,304,241 | B2 | * | 12/2007 | Trieb et al. ............ 174/74 R |
| 2003/0070822 | A1 | * | 4/2003 | Kanzaki et al. ........ 173/217 |
| 2006/0060374 | A1 | * | 3/2006 | Trieb et al. ............ 174/113 A |

FOREIGN PATENT DOCUMENTS

| | | |
|---|---|---|
| EP | 0 922 540 A2 | 6/1999 |
| GB | 2371152 A * | 7/2002 |
| JP | 08-336778 A | 12/1996 |
| JP | 2001-179658 A | 7/2001 |

* cited by examiner

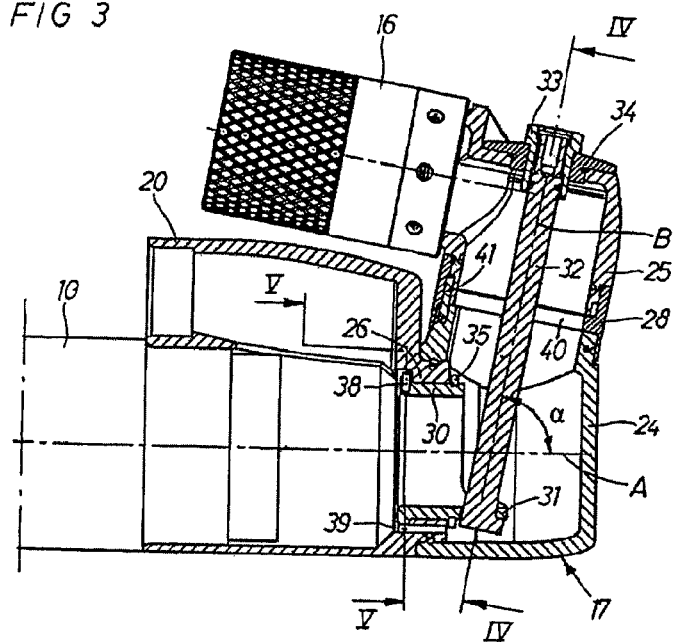
FIG 3
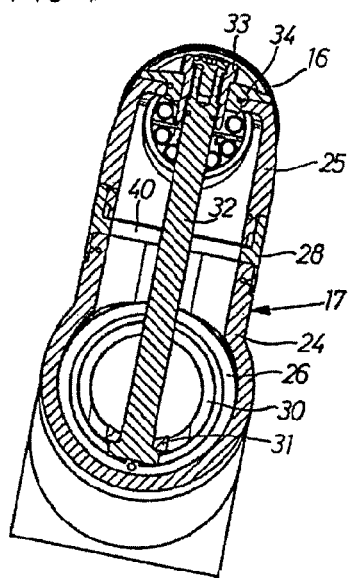
FIG 4
FIG 5

ELECTRIC POWER TOOL WITH SWIVELLED CABLE CONNECTION

This application is a U.S. National Phase Application under 35 USC 371 of International Application PCT/SE2007/000257 filed Mar. 16, 2007.

FIELD OF THE INVENTION

The invention relates to an electric power tool having a cable connection in the form of a jack for receiving a plug of an electric cable, and a swivel unit for positioning the jack in different directions to improve cable routing and tool handling.

BACKGROUND OF THE INVENTION

A problem concerned with today's power tools of this type is that the possible ways of positioning the jack and routing the cable in the vicinity of the tool are still limited. Accordingly, there is still a problem not only to obtain a comfortable handling of the tool but to get a well protected routing of the cable in different tool operating positions. This is a particular problem in multiple tool arrangements where two or more power tools are operated together.

SUMMARY OF THE INVENTION

The main object of the invention is to create a power tool with an improved cable connection arrangement where the above identified problem is solved.

A preferred embodiment of the invention is described below with reference to the accompanying drawing.

BRIEF DESCRIPTION OF THE DRAWINGS

FIG. 3 shows a longitudinal section through the rear end of the nutrunner in FIG. 1.

FIG. 4 shows a cross section along line IV-IV in FIG. 3.
FIG. 5 shows a cross section along line V-V in FIG. 3.

DETAILED DESCRIPTION

Figure 1:
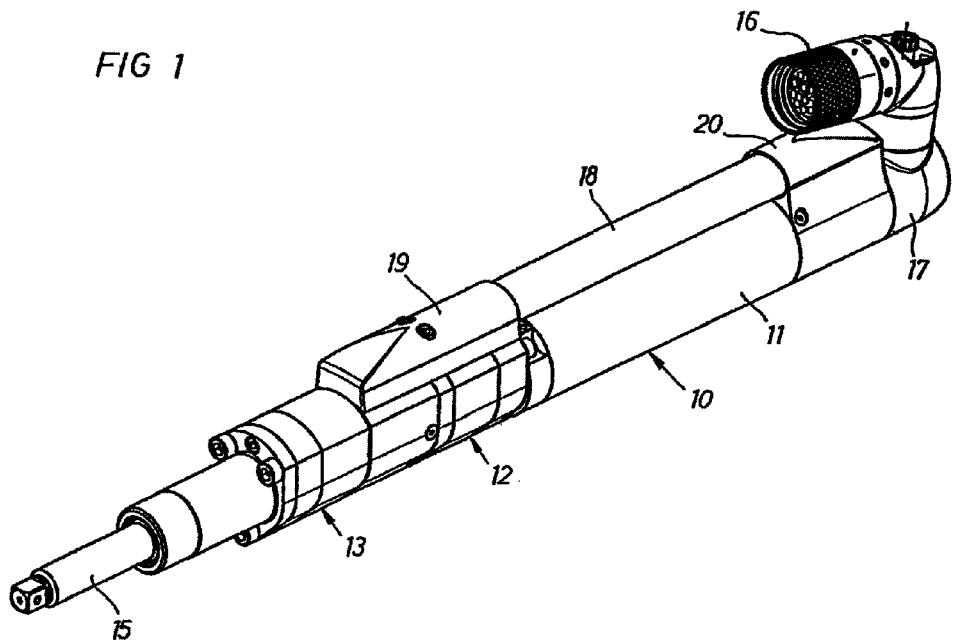
FIG. 1 shows a perspective view of a power nutrunner according to the invention.

The power nutrunner shown in FIG. 1 comprises a tubular housing 10, an electric motor 11 located in the housing 10, a reduction gearing 12 with torque and angle sensing means (not illustrated in detail), and a front end piece 13 supporting an output shaft 15.

At its rear end the housing 10 supports a connection jack 16 for receiving a multi-connector plug of a multi-core cable (not shown), and a swivel unit 17 is arranged to connect the jack 16 to the housing 10. The swivel unit 17, which will be described in further detail below, provides for routing electric conductors between the jack 16 and the nutrunner housing 10. These conductors include coarse power supply conductors connected to the motor 11, and fine conductors for communicating signals between the torque and angle sensing means at the front of the housing 10 and the jack 16. These fine conductors are routed from the rear end of the housing 10 to the front thereof via an external sleeve 18 extending between a forward cap 19 and a rear socket 20.

According to one aspect of the present invention, an electric power tool includes a housing, a motor, a jack for receiving a connection plug of an electric cable, and a swivel unit for carrying the jack and which is mounted at a rear end of the housing and arranged to provide for freedom of positioning the jack in different angular directions relative to the housing. The swivel unit has a first head mounted on the housing for rotation about a first axis, and a second head carrying the jack and being mounted on the first head for rotation about a second axis, the second axis forming an angle relative to the first axis, whereby the swivel unit provides freedom of rotation of the jack about two axes of rotation disposed at an angle relative to each other.

The swivel unit 17 comprises a first head 24 rotatably mounted on the rear end of the housing 10 for rotation about an axis of rotation A, and a second head 25 rotatably mounted on the first head 24 for rotation about an axis of rotation B. As illustrated in FIG. 3, the axes of rotation A and B are disposed at an angle α relative to each other, and although the cable connection jack 16 is rigidly mounted on the second head 25 its movability is universal relative to the housing 10.

Figure 2:
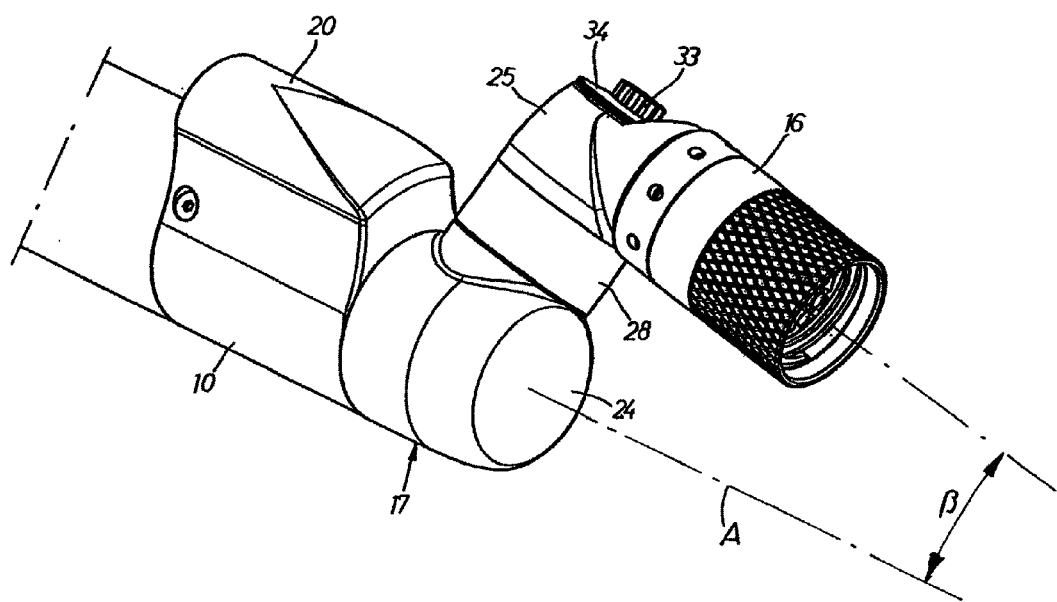
FIG. 2 shows the same power nutrunner as FIG. 1 but illustrates the cable connection jack in a different position.

The angle α between the rotation axes A and B is less than 90 degrees and provides for an inclined disposition of the rotation axis B relative to the rotation axis A, such that the jack 16 extends in an acute angle β relative to the axis A when oriented in a plane common to both rotation axes A and B. See FIG. 2.

The first head 24 is rotatively supported on a coaxial annular neck portion 26 of the tubular housing 10, whereas the second head 25 is rotatively supported on a tubular flange 27 on the first head 24 via an intermediate sleeve 28. Inside the neck portion 26 there is provided a rotatable thrust sleeve 30 which is formed with a rearwardly extending ear 31 for engagement with a lock spindle 32. The latter extends laterally from the first head 24 and axially through the second head 25 to be engaged by a nut element 33. A washer 34 beneath the nut element 33 engages the outside of the head 25. By its engagement with the lock spindle 32 the thrust sleeve 30 is co-rotating with the first head 24. The thrust sleeve 30 is axially locked by means of a lock ring 35.

The first head 24 is rotatable relative to the housing 10 over a rotation range of just less than 360 degrees. This rotation range is determined by a radial pin 38 secured to the thrust sleeve 30 and an axial pin 39 secured to the housing 10. The second head 25 is rotatable over a rotation range exceeding 360 degrees. This is obtained in that the intermediate sleeve 28 is formed with an inner annular flange 40, and a stop pin 41, which is secured to the flange 40 and protruding from the flange 40 in both directions, is arranged to co-operate with non-illustrated abutments on both the first head 24 and the second head 25. Since the second head 25 is rotatable relative to the intermediate sleeve 28 over a rotation range of little less than 360 degrees and the sleeve 28 is rotatable relative to the first head 24 over a certain minor angle the total rotation range for the second head 25 is somewhat more than 360 degrees relative to the first head 24.

In order to put the cable connection jack 16 in a position suitable for a particular nutrunner operating position and/or a certain arrangement with one or more other nutrunners the nut element 33 is loosened, and the jack 16 is rotated about the rotation axes A and B of the first and second heads 24, 25 until the desired position is obtained. Then, the nut element 33 is tightened against the washer 34, whereby the second head 25 is clamped against the first head 24 via the intermediate sleeve 28 such that a friction lock is obtained between both between the head 25 and the sleeve 28 and between the sleeve 28 and the first head 24. Simultaneously, the lock spindle 32 applies a tension force on the ear 31 of the thrust sleeve 30, whereby laterally directed force is obtained on the thrust sleeve 30 and as a result a counter directed lateral force is generated on the first head 24. This means that a friction lock is obtained between the first head 24 and the outside surface of the neck portion 26 of the housing 10 as well as between the thrust sleeve 30 and the inside surface of the neck portion 26. Accordingly, by tightening the nut element 33 and creating a tension force in the lock spindle 32 both heads 24, 25 are frictionally locked against rotation, and the jack 16 is arrested in a desired position.

The swivel unit according to the invention, including the two rotatable heads 24, 25 and the common lock arrangement with the lock spindle 32 and nut element 33, is advantageous in that it provides a universal movability and freedom of rotation of the cable connecting jack 16 and a very simple and easy to handle lock mechanism to arrest the jack 16 in desired positions. This also means that the routing of the cable and handling of the nutrunner is facilitated, thereby gaining the productivity of the tool.

The invention claimed is:

1. An electric power tool comprising:
a housing,
a motor,
a jack for receiving a connection plug of an electric cable, and
a swivel unit for carrying the jack and which is mounted at a rear end of the housing and arranged to provide for freedom of positioning the jack in different angular directions relative to the housing,
wherein said swivel unit comprises a first head mounted on the housing for rotation about a first axis, and a second head carrying said jack and being mounted on said first head for rotation about a second axis, said second axis forming an angle $\alpha$ relative to said first axis, whereby said swivel unit provides freedom of rotation of said jack about two axes of rotation disposed at an angle relative to each other,
wherein the housing is tubular in shape, and said first head is mounted at one end of the housing, and wherein said first axis has a same direction as a geometric axis of the housing, and
wherein each one of said first head and said second head is individually rotatable within a certain range of rotation about said first and second axes, respectively, and a lock device is provided for arresting simultaneously both of said first head and said second head in any desired position within the respective ranges of rotation thereof.

2. The power tool according to claim 1, wherein said angle $\alpha$ is less than 90 degrees.

3. The power tool according to claim 2, wherein said certain range of rotation of said first head is less than 360 degrees.

4. The power tool according to claim 1, wherein said certain range of rotation of the first head is less than 360 degrees.

5. The power tool according to claim 4, wherein the lock device comprises a clamping device common to said first head and said second head which is activatable to arrest both of said first head and said second head by friction locks.

6. The power tool according to claim 5, wherein said jack is disposed on said second head so as to receive a cable plug in a direction substantially perpendicular to said second axis of rotation.

7. The power tool according to claim 1, wherein said lock device comprises a lock spindle which extends axially through the second head, and a nut element which engages the lock spindle to obtain a friction lock between the second head and the first head and a friction lock between the first head and the housing.

\* \* \* \* \*